(12) United States Patent
Spurlock et al.

(10) Patent No.: US 10,642,976 B2
(45) Date of Patent: May 5, 2020

(54) MALWARE DETECTION USING A DIGITAL CERTIFICATE

(71) Applicant: McAfee, LLC, Santa Clara, CA (US)

(72) Inventors: Joel R. Spurlock, Portland, OR (US); Ramnath Venugopalan, Webster, NY (US)

(73) Assignee: McAfee, LLC, Santa Clara, CA (US)

( * ) Notice: Subject to any disclaimer, the term of this patent is extended or adjusted under 35 U.S.C. 154(b) by 140 days.

(21) Appl. No.: 14/752,874

(22) Filed: Jun. 27, 2015

(65) Prior Publication Data
US 2016/0378983 A1 Dec. 29, 2016

(51) Int. Cl.
*G06F 21/56* (2013.01)
*H04L 29/06* (2006.01)
*G06F 12/14* (2006.01)

(52) U.S. Cl.
CPC .......... *G06F 21/563* (2013.01); *G06F 21/567* (2013.01)

(58) Field of Classification Search
CPC ...... G06F 21/563; G06F 21/567; G06F 21/44; G06F 21/50; G06F 21/51; G06F 21/64; G06F 21/33
See application file for complete search history.

(56) References Cited

U.S. PATENT DOCUMENTS

| | | | |
|---|---|---|---|
| 5,892,904 A * | 4/1999 | Atkinson | G06F 21/33 713/170 |
| 5,987,610 A | 11/1999 | Franczek et al. | |
| 6,044,155 A * | 3/2000 | Thomlinson | G06F 21/6245 380/277 |
| 6,073,142 A | 6/2000 | Geiger et al. | |
| 6,367,012 B1 * | 4/2002 | Atkinson | G06F 21/51 713/167 |
| 6,460,050 B1 | 10/2002 | Pace et al. | |
| 7,506,155 B1 | 3/2009 | Stewart et al. | |
| 8,484,739 B1 | 7/2013 | Seshadri | |
| 8,499,150 B1 | 7/2013 | Nachenberg | |

(Continued)

FOREIGN PATENT DOCUMENTS

| | | |
|---|---|---|
| JP | 2001216173 A | 8/2001 |
| JP | 2010535372 A | 11/2010 |

(Continued)

OTHER PUBLICATIONS

Kirtland, Mary; Safe Web Surfing with the Internet Component Download Service, Jul. 1996, Microsoft Developer's Nedwork (MSDN), Microsoft Systems Journal.*

(Continued)

*Primary Examiner* — Michael Simitoski
(74) *Attorney, Agent, or Firm* — Patent Capital Group (57) ABSTRACT

Particular embodiments described herein provide for an electronic device that can be configured to analyze data related to a digital certificate and assign a reputation to the digital certificate, where the reputation includes an indication if the data is proper. The analysis of the data can include determining if code signing for the digital certificate matches binary code for the digital certificate, if the digital certificate has been grafted to the data by modifying a portable executable file header, or the digital certificate is the same as another trusted digital certificate associated with different data.

12 Claims, 7 Drawing Sheets

(56) References Cited

U.S. PATENT DOCUMENTS

| | | | |
|---|---|---|---|
| 8,650,649 B1* | 2/2014 | Chen | G06F 21/64 |
| | | | 726/22 |
| 9,058,504 B1 | 6/2015 | Swanson et al. | |
| 9,338,012 B1* | 5/2016 | Naik | H04L 9/3247 |
| 2006/0100010 A1* | 5/2006 | Gatto | G06F 21/51 |
| | | | 463/29 |
| 2006/0160626 A1* | 7/2006 | Gatto | A63F 13/12 |
| | | | 463/43 |
| 2006/0184798 A1* | 8/2006 | Yaldwyn | G06F 21/10 |
| | | | 713/180 |
| 2008/0133928 A1* | 6/2008 | Torrubia | G06F 21/10 |
| | | | 713/176 |
| 2008/0155691 A1 | 6/2008 | Fossen et al. | |
| 2009/0064134 A1* | 3/2009 | Cox | G06F 21/51 |
| | | | 717/178 |
| 2009/0293126 A1 | 11/2009 | Archer et al. | |
| 2010/0115269 A1* | 5/2010 | Allen | G06F 21/33 |
| | | | 713/157 |
| 2010/0162395 A1* | 6/2010 | Kennedy | G06F 21/563 |
| | | | 726/23 |
| 2011/0167275 A1 | 7/2011 | Niemelä | |
| 2012/0096516 A1* | 4/2012 | Sobel | G06F 21/645 |
| | | | 726/2 |
| 2012/0331563 A1* | 12/2012 | Chaudhury | G06F 21/6218 |
| | | | 726/27 |
| 2013/0097661 A1* | 4/2013 | Ma | H04L 63/145 |
| | | | 726/1 |
| 2013/0139260 A1 | 5/2013 | McDougal | |
| 2014/0040873 A1* | 2/2014 | Goldman | G06F 8/65 |
| | | | 717/168 |
| 2014/0237582 A1* | 8/2014 | Niemela | H04L 63/0823 |
| | | | 726/10 |
| 2014/0283054 A1* | 9/2014 | Janjua | H04L 63/1408 |
| | | | 726/23 |
| 2016/0212104 A1* | 7/2016 | Niemela | H04L 63/123 |
| 2016/0277193 A1* | 9/2016 | Sabin | H04L 9/3263 |
| 2016/0321452 A1* | 11/2016 | Richardson | G06F 21/50 |
| 2017/0187684 A1* | 6/2017 | Fossen | G06F 21/562 |

FOREIGN PATENT DOCUMENTS

| | | |
|---|---|---|
| JP | 2012048729 A | 3/2012 |
| WO | 2014108993 A1 | 7/2014 |

OTHER PUBLICATIONS

Sebastien Pouliot, chktrust(1)—Linux man page, 2003, Motus Technologies, p. 1, downloaded from https://linux.die.net/man/1/chktrust on Dec. 6, 2017.*

International Search Report and Written Opinion in International Application No. PCT/US2016/034218, dated Aug. 24, 2016, 12 pages.

* cited by examiner

MALWARE DETECTION USING A DIGITAL CERTIFICATE

TECHNICAL FIELD

This disclosure relates in general to the field of information security, and more particularly, to malware detection using a digital certificate.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
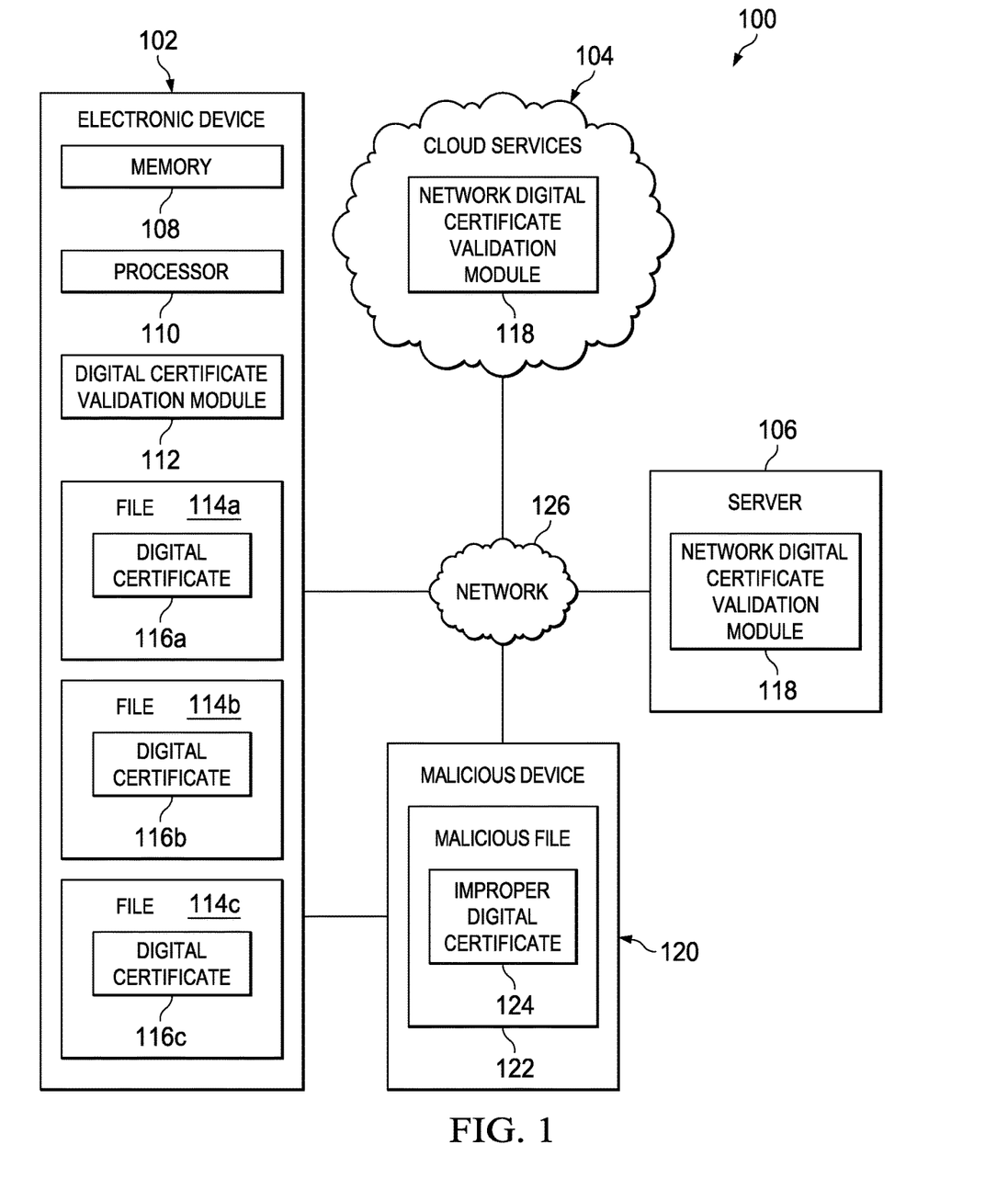
FIG. 1 is a simplified block diagram of a communication system for malware detection using a digital certificate in accordance with an embodiment of the present disclosure.

FIG. 1 is a simplified block diagram of a communication system 100 for malware detection using a digital certificate in accordance with an embodiment of the present disclosure. As illustrated in FIG. 1, an embodiment of communication system 100 can include an electronic device 102, cloud services 104, and a server 106. Electronic device 102 can include memory 108, a processor 110, a digital certificate verification module 112, and one or more files 114a-114c. Each file 114a-114c can include a digital certificate 116a-116c respectively. Cloud services 104 and server 106 may each include a network digital certificate verification module 118. Electronic device 102, cloud services 104, and server 106 may be in communication using network 126.

Malicious device 120 may attempt to introduce or infect electronic device 102 with a malicious file 122. Malicious file 122 can include an improper digital certificate 124 in an attempt to hide the true identity or purpose of malicious file 124. Malicious device 120 may be in communication with electronic device 102 using network 126 or may be physically connected to electronic device 102 (e.g., through a Universal Serial Bus (USB) type connection).

Malicious file 122 may be malware or malicious software that infects a host computer (e.g., electronic device 102) to perform any number of malicious actions, such as stealing sensitive information from a business or individual associated with the host computer, propagating to other host computers, and/or assisting with distributed denial of service attacks, sending out spam or malicious emails from the host computer, etc.

Digital certificate validation module 112 can be configured to identify improper digital certificate 124 and can identify malicious file 122 as malware. For example, digital certificate validation module 112 can be configured to analyze each file 114a-114c and their digital certificate 116a-116c to determine if the digital certificate is improper. Combined with metadata about each file 114a-114c and each digital certificate 116a-116c, an improper or malicious digital certificate can be identified. In a specific example, digital certification validation module 112 can analyze each digital certificate 116a-116c and determine if the code signing (e.g., Authenticode®) in each digital certificate 116a-115c matches the binary code. Code signing is the process of digitally signing executables and scripts to confirm the software author and attempt to guarantee that the code has not been altered or corrupted since it was signed by use of a cryptographic hash function. The cryptographic hash function can provide verification of the integrity of the digital certificate by indicating whether any changes have been made to the digital certificate.

Elements of FIG. 1 may be coupled to one another through one or more interfaces employing any suitable connections (wired or wireless), which provide viable pathways for network (e.g., network 126) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication systems 100a and 100b may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Current malware detection systems and methods often ignore or do not analyze files with digital certificates. This is because, a general trust is applied by certificate validation, informing systems that the file is trusted and the file can be executed. Some malware detection systems and security products use the knowledge of trust yielded by the digital certificate to bypass inspection of a file with the digital certificate. Therefore, one common way to bypass current malware detection systems and security products is to graft a digital certificate to a malicious file. For example, it is possible to modify a directory structure in a portable executable (PE) header and write a digital certificate to the malicious file in a way that the digital certificate or digital signing of the malicious file appears valid. What is needed is a system and method to analyze the validity of the digital certificate and determine if the digital certificate is improper.

A communication system for malware detection using a digital certificate, as outlined in FIG. 1, can resolve these issues (and others). Communication system 100 may be configured to analyze a digital certificate (e.g., digital certificate 116a-166c) for a file (e.g., file 114a-114c) and determine if the file has an improper digital certificate which could indicate that the file is malicious. For example, digital certification module 112 can analyze a file and determine if the file has a malformed certificate that is grafted on by modifying a PE header and directory. One way to determine this is to use Authenticode validation where the improper digital certificate will fail the Authenticode validation (e.g., bad hash). Also, an improper digital certificate can be identified if the certificate shares a fingerprint of a known digital certificate or the file hash is unique to the system. A digital signing using a certificate that contains the same fingerprint as a trusted certificate but has an invalid Authenticode is an indication of an improper digital certificate and is a strong indication of malware using a stolen certificate or one has been modified (e.g. through parasitic infection). In the parasitic infection case, minor errors can be eliminated by checking if the file is under windows file protection or other registrations of legitimate applications in the operating system. In an example, a fingerprint of a known certificate can be identified through a more intensive analysis using network digital certificate validation module 118. For example a public key or thumbprint may be used to identify a known digital certificate. In another example, network digital certificate validation module 118 can be queried to determine if the fingerprint is the same as another digital certificate. Network digital certificate validation module 118 can also be used to determine the trust of a certificate by using network analysis techniques of large batch samples.

Turning to the infrastructure of FIG. 1, communication system 100 in accordance with an example embodiment is shown. Generally, communication system 100 can be implemented in any type or topology of networks. Network 126 represents a series of points or nodes of interconnected communication paths for receiving and transmitting packets of information that propagate through communication system 100. Network 126 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102, cloud services 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, electronic device 102, cloud services 104, and server 106 can include memory elements (e.g., memory 108) for storing information to be used in the operations outlined herein. Electronic device 102, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, cloud services 104, and server 106 may include software modules (e.g., digital certificate validation module 112 and network digital certificate validation module 118) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 102, cloud services 104, and server 106 may include a processor (e.g., processor 110) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and include, for example, desktop computers, laptop computers, mobile devices, personal digital assistants, smartphones, tablets, or other similar devices. Cloud services 104 is configured to provide cloud services to electronic device 102. Cloud services may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 126). The term 'server' is inclusive of devices used to serve the requests of clients and/or perform some computational task on behalf of clients within communication system 100. Although digital certificate validation module 112 is represented in FIG. 1 as being located in electronic device 102, this is for illustrative purposes only. Digital certificate validation module 112 could be combined or separated in any suitable configuration. Furthermore, digital certificate validation module 112 could be integrated with or distributed in another network accessible by electronic device 102 such as cloud services 104 or server 106.

Figure 2A:
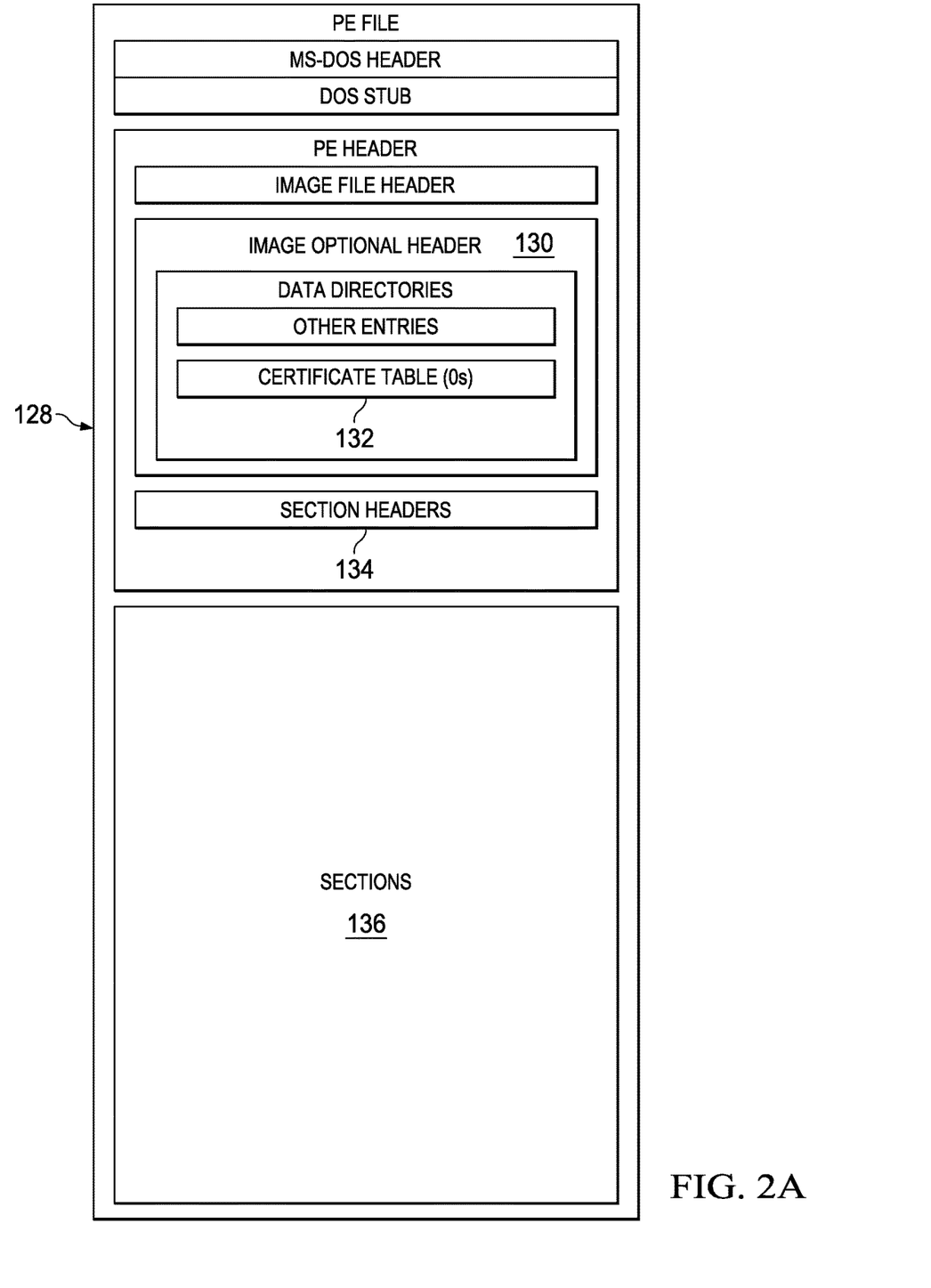
FIG. 2A is a simplified block diagram of a communication system for malware detection using a digital certificate in accordance with an embodiment of the present disclosure.

Turning to FIG. 2A, FIG. 2A is block diagram of an uncharacterized file 128. Uncharacterized file 128 could be a trusted file, benign file, or a malicious file. Uncharacterized file 128 can include an image optional header 130, section headers 134, and sections 136. Image optional header 130 can include a certificate table 132. Image optional header 130 can provide information to a loader of uncharacterized file 128. Certificate table 132 can indicate if the file includes one or more digital certificates. Section headers 134 can identify the content or data in sections 136. Sections 136 includes data related to uncharacterized file 128 such as the payload of uncharacterized file 128. Because uncharacterized file 128 does not include a digital certificate, it can be relatively easy for most malware detection systems and security products to identify uncharacterized file 128 as a malicious file if uncharacterized file 128 was malicious.

Figure 2B:
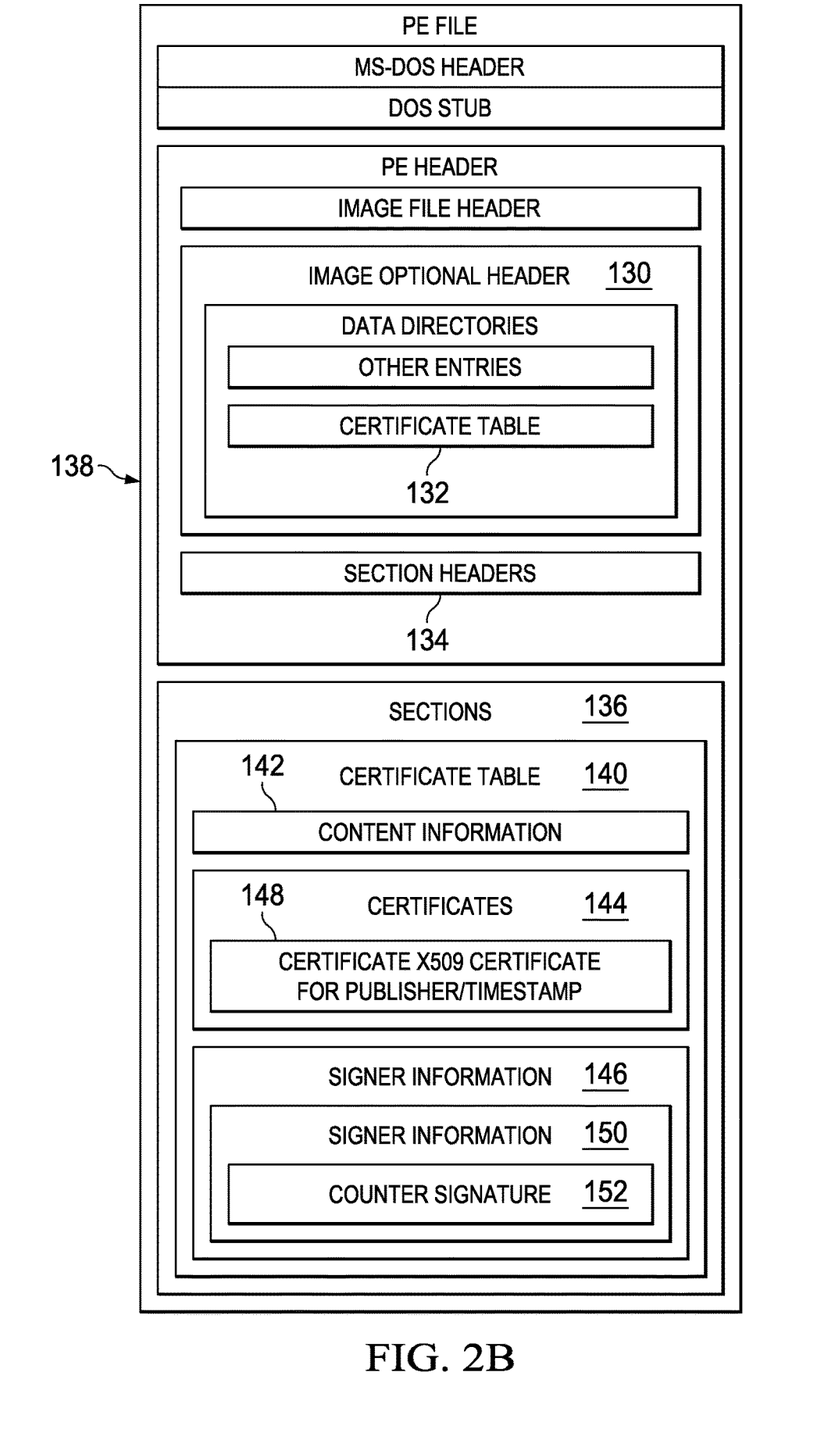
FIG. 2B is a simplified block diagram of a communication system for malware detection using a digital certificate in accordance with an embodiment of the present disclosure.

Turning to FIG. 2B, FIG. 2B is block diagram of a digitally signed file 138 with a digital certificate. If digitally signed file 138 was a malicious file, unlike uncharacterized file 128, some malware detection systems and security products would not identify digitally signed file 138 as a malicious file. Digitally signed file 138 can include image optional header 130, section, headers 134, and sections 136. Sections 136 can include certificate table 140. Certificate table 140 can include content information 142, certificates 144, and signer information 146. Certificates 144 can includes any digital certificates for digitally signed file 138. For example, certificates 144 is illustrated as including certificate X509 certificate for publisher/timestamp 148. Signer information 146 includes the signer information for each digital certificate in certificates 144. For example, signer information 146 is illustrated as including digital certificate signer information 150 for certificate X509 certificate for publisher/timestamp 148. Digital certificate signer information 150 can include counter signature 152.

Digital certificate validation module 112 (or network digital certificate validation module 118) can be configured to analyze digitally signed file 138 and determine if digitally signed file 138 is malicious. For example, digital certificate validation module 112 can analyze certificate table 132 to determine if a security directory entry has been set in a way that would indicate a malicious file. In addition, digital certificate validation module 112 can analyze section headers 134 and determine if section sizes have been modified. If they were modified, then digitally signed file 138 may be malicious. Also, digital certification validation module 112 can analyzed content information 142 and determine if the Authenticode has been modified to match Authenticode for a known malware file. Digital certificate validation module 112 can also be configured to analyze certificate table 140 and determine if a certificate has been added from another legitimate file. Further, digital certificate validation module 112 can analyze certificate X509 certificate for publisher/timestamp 148 to determine if certificate details have been modified, which would indicate malicious activity. In addition, digital certification validation module 112 can analyze counter signature 152 in digital certificate signer information 150 to determine if counter signature 152 includes any unauthenticated attributes, which can indicate malicious activity.

Figure 3:
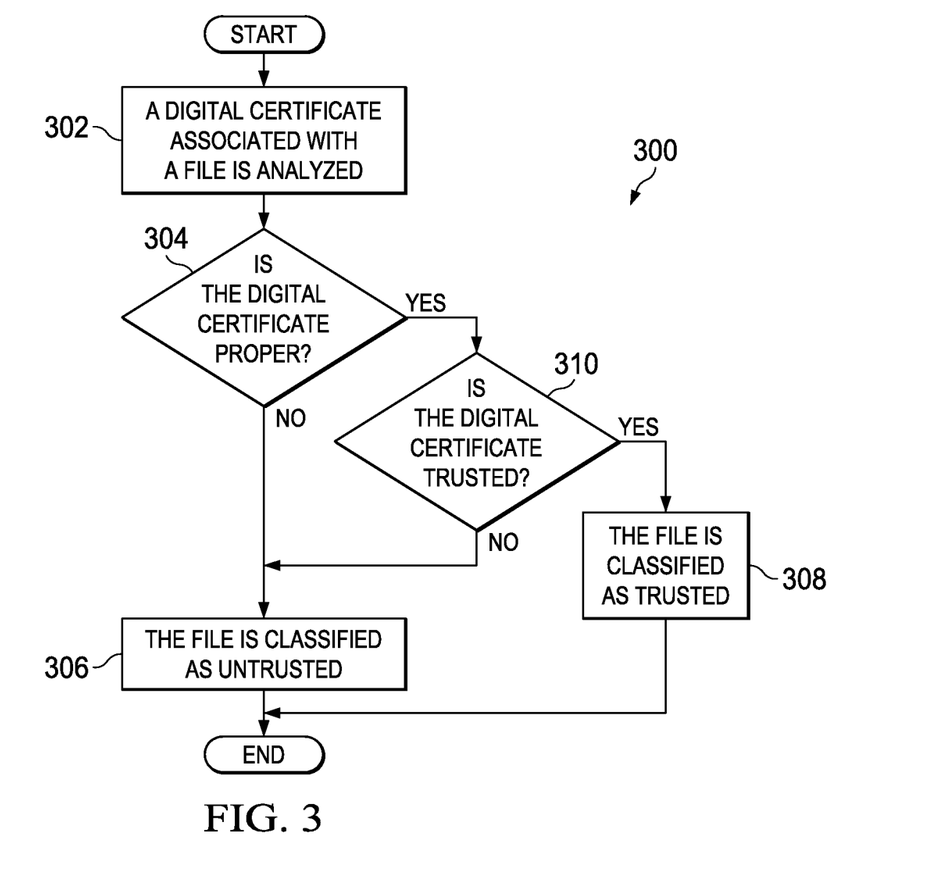
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with malware detection using a digital certificate, in accordance with an embodiment. In an embodiment, one or more operations of flow 300 may be performed by digital certificate validation module 112 and network digital certificate validation module 118. At 302, a digital certificate associated with a file an analyzed. At 304, the system determines if the digital certificate is proper. To determine if the digital certificate is proper, the system can analyze the file and data in the file that is related to the digital certificate. For example, the system can determine if code signing for the digital certificate matches binary code for the digital certificate, if the digital certificate has been grafted to the data by modifying a portable executable file header, if the digital certificate is the same or has the same finger print as another trusted digital certificate associated with different data, etc. If the digital certificate is not proper (e.g., if code signing for the digital certificate does not match binary code for the digital certificate, if the digital certificate has been grafted to the data by modifying a portable executable file header, if the digital certificate is the same or has the same finger print as another trusted digital certificate associated with different data, etc,), then the file may be classified as untrusted, as in 306. If the digital certificate is proper, then the system determines if the digital certificate is trusted, as in 310. For example, the data related to the digital certificate may be proper but the digital certificate itself may be untrusted (e.g., a digital certificate known to be associated with malware, etc.). If the digital certificate is not trusted, then file may be classified as untrusted as in 306. If the digital certificate is trusted, then the file may be classified as trusted, as in 308.

Figure 4:
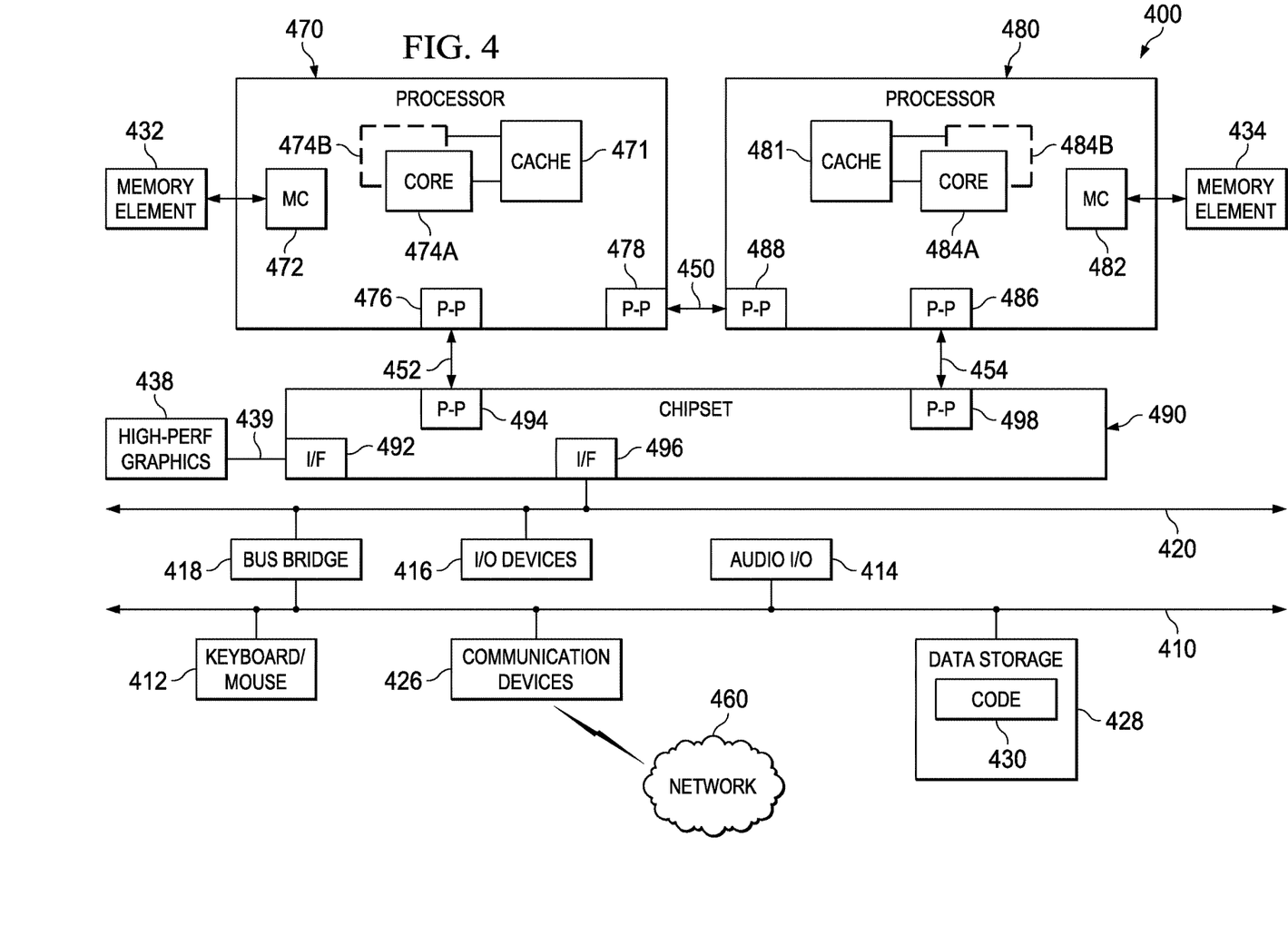
FIG. 4 is a block diagram illustrating an example computing system that is arranged in a point-to-point configuration in accordance with an embodiment.

Turning to FIG. 4, FIG. 4 illustrates a computing system 400 that is arranged in a point-to-point (PtP) configuration according to an embodiment. In particular, FIG. 4 shows a system where processors, memory, and input/output devices are interconnected by a number of point-to-point interfaces. Generally, one or more of the network elements of communication system 100 may be configured in the same or similar manner as computing system 400.

As illustrated in FIG. 4, system 400 may include several processors, of which only two, processors 470 and 480, are shown for clarity. While two processors 470 and 480 are shown, it is to be understood that an embodiment of system 400 may also include only one such processor. Processors 470 and 480 may each include a set of cores (i.e., processor cores 474A and 474B and processor cores 484A and 484B) to execute multiple threads of a program. The cores may be configured to execute instruction code in a manner similar to that discussed above with reference to FIGS. 1-3. Each processor 470, 480 may include at least one shared cache 471, 481. Shared caches 471, 481 may store data (e.g., instructions) that are utilized by one or more components of processors 470, 480, such as processor cores 474 and 484.

Processors 470 and 480 may also each include integrated memory controller logic (MC) 472 and 482 to communicate with memory elements 432 and 434. Memory elements 432 and/or 434 may store various data used by processors 470 and 480. In alternative embodiments, memory controller logic 472 and 482 may be discrete logic separate from processors 470 and 480.

Processors 470 and 480 may be any type of processor and may exchange data via a point-to-point (PtP) interface 450 using point-to-point interface circuits 478 and 488, respectively. Processors 470 and 480 may each exchange data with a chipset 490 via individual point-to-point interfaces 452 and 454 using point-to-point interface circuits 476, 486, 494, and 498. Chipset 490 may also exchange data with a high-performance graphics circuit 438 via a high-performance graphics interface 439, using an interface circuit 492, which could be a PtP interface circuit. In alternative embodiments, any or all of the PtP links illustrated in FIG. 4 could be implemented as a multi-drop bus rather than a PtP link.

Chipset 490 may be in communication with a bus 420 via an interface circuit 496. Bus 420 may have one or more devices that communicate over it, such as a bus bridge 418 and I/O devices 416. Via a bus 410, bus bridge 418 may be in communication with other devices such as a keyboard/mouse 412 (or other input devices such as a touch screen, trackball, etc.), communication devices 426 (such as modems, network interface devices, or other types of communication devices that may communicate through a computer network 460), audio I/O devices 414, and/or a data storage device 428. Data storage device 428 may store code 430, which may be executed by processors 470 and/or 480. In alternative embodiments, any portions of the bus architectures could be implemented with one or more PtP links.

The computer system depicted in FIG. 4 is a schematic illustration of an embodiment of a computing system that may be utilized to implement various embodiments discussed herein. It will be appreciated that various components of the system depicted in FIG. 4 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 5:
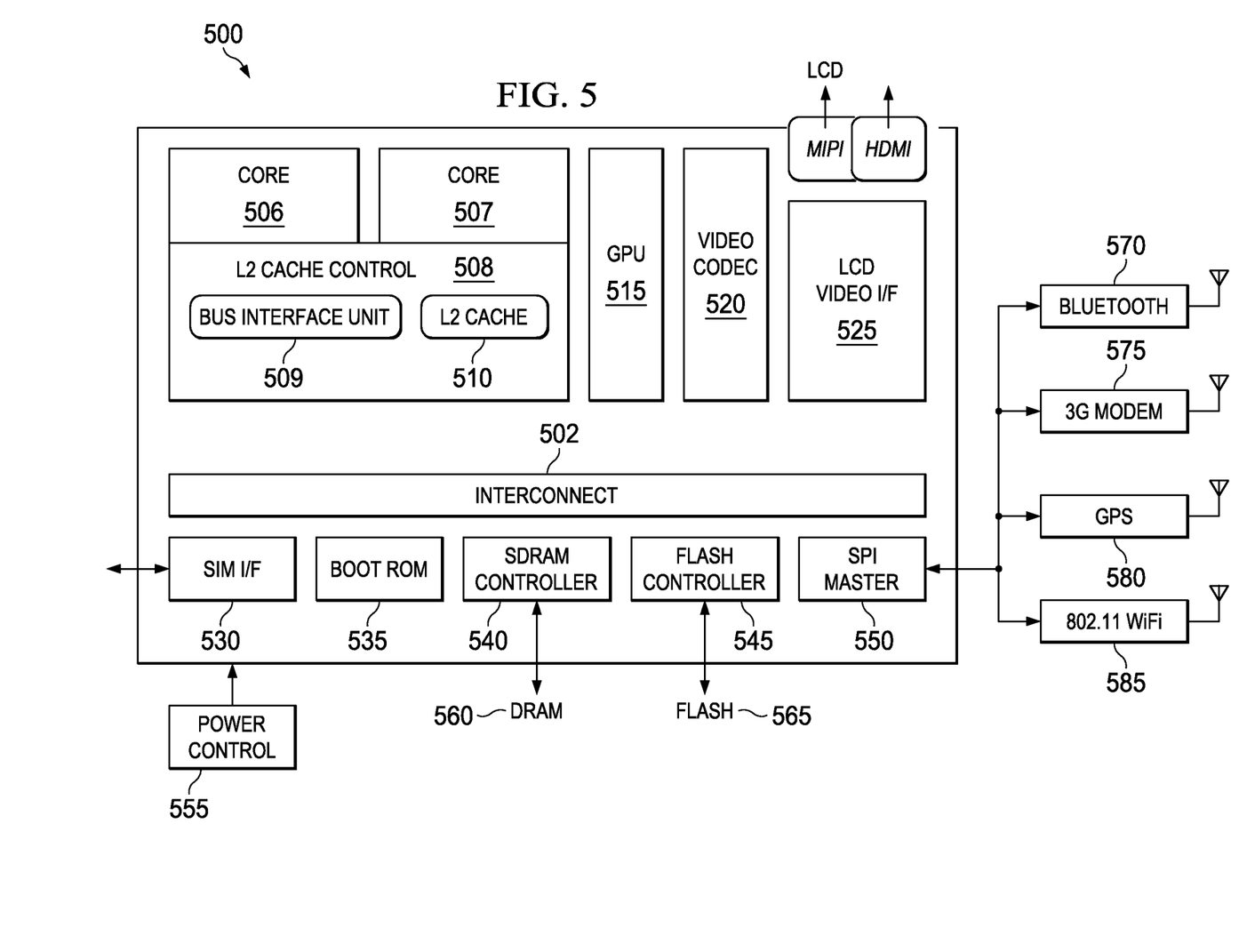
FIG. 5 is a simplified block diagram associated with an example ARM ecosystem system on chip (SOC) of the present disclosure.

Turning to FIG. 5, FIG. 5 is a simplified block diagram associated with an example ARM ecosystem SOC 500 of the present disclosure. At least one example implementation of the present disclosure can include the determining the malware detection using a digital certificate features discussed herein and an ARM component. For example, the example of FIG. 5 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 5, ARM ecosystem SOC 500 may include multiple cores 506-507, an L2 cache control 508, a bus interface unit 509, an L2 cache 510, a graphics processing unit (GPU) 515, an interconnect 502, a video codec 520, and a liquid crystal display (LCD) I/F 525, which may be associated with mobile industry processor interface (MIPI)/high-definition multimedia interface (HDMI) links that couple to an LCD.

ARM ecosystem SOC 500 may also include a subscriber identity module (SIM) I/F 530, a boot read-only memory (ROM) 535, a synchronous dynamic random access memory (SDRAM) controller 540, a flash controller 545, a serial peripheral interface (SPI) master 550, a suitable power control 555, a dynamic RAM (DRAM) 560, and flash 565. In addition, one or more example embodiments include one or more communication capabilities, interfaces, and features such as instances of Bluetooth™ 570, a 3G modem 575, a global positioning system (GPS) 580, and an 802.11 Wi-Fi 585.

In operation, the example of FIG. 5 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 6:
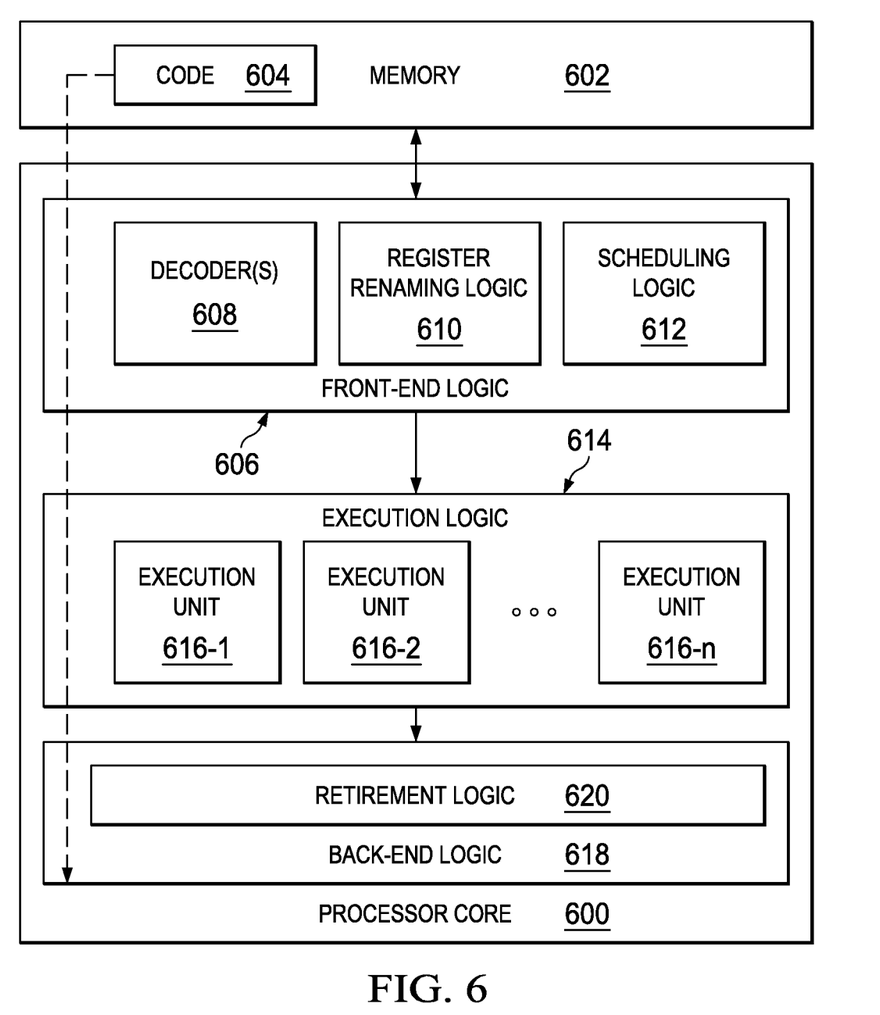
FIG. 6 is a block diagram illustrating an example processor core in accordance with an embodiment.

Turning to FIG. 6, FIG. 6 illustrates a processor core 600 according to an embodiment. Processor core 600 may be the core for any type of processor, such as a micro-processor, an embedded processor, a digital signal processor (DSP), a network processor, or other device to execute code. Although only one processor core 600 is illustrated in FIG. 6, a processor may alternatively include more than one of the processor core 600 illustrated in FIG. 6. For example, processor core 600 represents one example embodiment of processors cores 474a, 474b, 474a, and 474b shown and described with reference to processors 470 and 480 of FIG. 4. Processor core 600 may be a single-threaded core or, for at least one embodiment, processor core 600 may be multithreaded in that it may include more than one hardware thread context (or "logical processor") per core.

FIG. 6 also illustrates a memory 602 coupled to processor core 600 in accordance with an embodiment. Memory 602 may be any of a wide variety of memories (including various layers of memory hierarchy) as are known or otherwise available to those of skill in the art. Memory 602 may include code 604, which may be one or more instructions, to be executed by processor core 600. Processor core 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor core 600 can also include execution logic 614 having a set of execution units 616-1 through 616-N. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor core 600 allows out of order execution but requires in order retirement of instructions. Retirement logic 620 may take a variety of known forms (e.g., re-order buffers or the like). In this manner, processor core 600 is transformed during execution of code 604, at least in terms of the output generated by the decoder, hardware registers and tables utilized by register renaming logic 610, and any registers (not shown) modified by execution logic 614.

Although not illustrated in FIG. 6, a processor may include other elements on a chip with processor core 600, at least some of which were shown and described herein with reference to FIG. 4. For example, as shown in FIG. 4, a processor may include memory control logic along with processor core 600. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100a and 100b and their teachings are readily scalable and can accommodate a large number of components, as well as more complicated/sophisticated arrangements and configurations. Accordingly, the examples provided should not limit the scope or inhibit the broad teachings of communication systems 100a and 100b as potentially applied to a myriad of other architectures.

It is also important to note that the operations in the preceding flow diagram (i.e., FIG. 3) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor, cause the at least one processor to analyze data related to a digital certificate, and assign a reputation to the digital certificate, wherein the reputation includes an indication if the data related to the digital certificate is proper.

In Example C2, the subject matter of Example C1 can optionally include where the analysis of the data related to the digital certificate includes determining if code signing for the digital certificate matches binary code for the digital certificate.

In Example C3, the subject matter of any one of Examples C1-C2 can optionally include where the code signing is Authenticode.

In Example C4, the subject matter of any one of Examples C1-C3 can optionally include where the analysis of the data related to the digital certificate includes determining if the digital certificate has been grafted to the data by modifying a portable executable file header.

In Example C5, the subject matter of any one of Examples C1-C4 can optionally include where the analysis of the data related to the digital certificate includes determining the digital certificate is the same as another trusted digital certificate associated with different data.

In Example C6, the subject matter of any one of Example C1-05 can optionally include where the digital certificate is classified as untrusted if the analysis of the data related to the digital certificate indicates that the data is improper.

In Example A1, an apparatus can include a digital certificate validation module configured to identify a file that includes a digital certificate and data related to the digital certificate, analyze the data related to the digital certificate, and assign a reputation to the file, where the reputation includes an indication if the data related to the digital certificate is proper.

In Example, A2, the subject matter of Example A1 can optionally include where the analysis of the data related to the digital certificate includes determining if code signing for the digital certificate matches binary code for the digital certificate.

In Example A3, the subject matter of any one of Examples A1-A2 can optionally include where the code signing is Authenticode.

In Example A4, the subject matter of any one of Examples A1-A3 can optionally include where the analysis of the data includes determining if the has been grafted to the data by modifying a portable executable file header.

In Example A5, the subject matter of any one of Examples A1-A4 can optionally include where the analysis of the data related to the digital certificate includes determining the digital certificate is the same as another trusted digital certificate associated with different data.

In Example A6, the subject matter of any one of Examples A1-A5 can optionally include where the file is classified as untrusted if the analysis of the data related to the digital certificate indicates that the data is improper.

Example M1 is a method including analyzing data related to a digital certificate, and assigning a reputation to the digital certificate, wherein the reputation includes an indication if the data related to the digital certificate is proper.

In Example M2, the subject matter of Example M1 can optionally include where the analysis of the data includes determining if code signing for the digital certificate matches binary code for the digital certificate.

In Example M3, the subject matter of any one of the Examples M1-M2 can optionally include where the code signing is Authenticode.

In Example M4, the subject matter of any one of the Examples M1-M3 can optionally include where the analysis of the data includes determining if the digital certificate has been grafted to the data by modifying a portable executable file header.

In Example M5, the subject matter of any one of the Examples M1-M4 can optionally include where the analysis of the data includes determining the digital certificate is the same as another trusted digital certificate associated with different data.

Example S1 is a system for malware detection using a digital certificate, the system including a digital certificate validation module configured for identifying data related to a digital certificate, analyzing the data related to the digital certificate, and assigning a reputation to the digital certificate, wherein the reputation includes an indication if the data is proper.

In Example S2, the subject matter of Example S1 can optionally include where the analysis of the data includes determining if code signing for the digital certificate matches binary code for the digital certificate.

In Example S3, the subject matter of any one of Examples S1 and S2 can optionally include where the analysis of the data includes determining if the digital certificate has been grafted to the data by modifying a portable executable file header.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor, cause the at least one processor to:
    analyze data related to a digital certificate associated with a file to determine whether the data is proper or not proper, wherein the analysis of the data includes determining if the digital certificate has been grafted to the data by modifying a portable executable file header, determining the digital certificate is the same as another trusted digital certificate associated with different data, and determining if code signing for the digital certificate matches binary code for the digital certificate;
    assign a reputation to the digital certificate, wherein the reputation includes an indication if the data related to the digital certificate is proper or not proper, and wherein the data related to the digital certificate is not proper if the digital certificate has been grafted to the data by modifying the portable executable header, if the digital certificate is the same as another trusted digital certificate associated with different data, or if code signing for the digital certificate does not match binary code for the digital certificate;

determine, based on the assigned reputation to the digital certificate including the indication that the data is proper, whether the digital certificate is trusted or untrusted, wherein the digital certificate is untrusted if the digital certificate is known to be associated with malware; and classify, based on a determination that the digital certificate is trusted, the file as trusted.

2. The at least one non-transitory machine readable medium of claim 1, wherein the digital certificate is improper if the digital certificate fails Authenticode validation or has an invalid Authenticode.

3. The at least one non-transitory machine readable medium of claim 1, further comprising:

classifying a file that includes the digital certificate as untrusted based on the determination that the digital certificate is untrusted.

4. An apparatus comprising:

memory; and a hardware processor configured to:

identify a file stored in the memory that includes a digital certificate and data related to the digital certificate;

analyze the data related to the digital certificate to determine whether the data is proper or not proper, wherein the analysis of the data includes determining if the digital certificate has been grafted to the data by modifying a portable executable file header, determining the digital certificate is the same as another trusted digital certificate associated with different data, and determining if code signing for the digital certificate matches binary code for the digital certificate;

assign a reputation to the file, wherein the reputation includes an indication if the data related to the digital certificate is proper or not proper, and wherein the data related to the digital certificate is not proper if the digital certificate has been grafted to the data by modifying the portable executable header, if the digital certificate is the same as another trusted digital certificate associated with different data, or if code signing for the digital certificate does not match binary code for the digital certificate;

determine, based on the assigned reputation to the file including the indication that the data is proper, whether the digital certificate is trusted, wherein the digital certificate is untrusted if the digital certificate is known to be associated with malware; and classify, based on a determination that the digital certificate is trusted, the file as trusted.

5. The apparatus of claim 4, wherein the digital certificate is improper if the digital certificate fails Authenticode validation or has an invalid Authenticode.

6. The apparatus of claim 4, wherein the file is classified as untrusted based on a determination that the digital certificate is untrusted.

7. A method comprising:

analyzing data related to a digital certificate associated with a file to determine whether the data is proper or not proper, wherein the analysis of the data includes determining if the digital certificate has been grafted to the data by modifying a portable executable file header, determining the digital certificate is the same as another trusted digital certificate associated with different data, and determining if code signing for the digital certificate matches binary code for the digital certificate;

assigning a reputation to the digital certificate, wherein the reputation includes an indication if the data related to the digital certificate is proper or not proper, and wherein the data related to the digital certificate is not proper if the digital certificate has been grafted to the data by modifying the portable executable header, if the digital certificate is the same as another trusted digital certificate associated with different data, or if code signing for the digital certificate does not match binary code for the digital certificate;

determining, based on the assigned reputation to the digital certificate including the indication that the data is proper, whether the digital certificate is trusted or untrusted, wherein the digital certificate is untrusted if the digital certificate is known to be associated with malware; and classifying, based on a determination that the digital certificate is trusted, the file as trusted.

8. The method of claim 7, wherein the digital certificate is improper if the digital certificate fails Authenticode validation or has an invalid Authenticode.

9. The method of claim 7, further comprising:

classifying a file that includes the digital certificate as untrusted based on the determination that the digital certificate is untrusted.

10. A system for malware detection using a digital certificate, the system comprising:

memory in an electronic device;

a hardware processor in the electronic device, wherein the hardware processor is configured to execute a digital certificate validation module configured for:

identifying data stored in the memory related to a digital certificate associated with a file;

analyzing the data related to the digital certificate to determine whether the data is proper or not proper, wherein the analysis of the data includes determining if the digital certificate has been grafted to the data by modifying a portable executable file header, determining the digital certificate is the same as another trusted digital certificate associated with different data, and determining if code signing for the digital certificate matches binary code for the digital certificate;

assigning a reputation to the digital certificate, wherein the reputation includes an indication if the data related to the digital certificate is proper or not proper, and wherein the data related to the digital certificate is not proper if the digital certificate has been grafted to the data by modifying the portable executable header, if the digital certificate is the same as another trusted digital certificate associated with different data, or if code signing for the digital certificate does not match binary code for the digital certificate;

determining, based on the assigned reputation to the digital certificate including the indication that the data is proper, whether the digital certificate is trusted or untrusted, wherein the digital certificate is untrusted if the digital certificate is known to be associated with malware; and classifying, based on a determination that the digital certificate is trusted, the file as trusted.

11. The system of claim 10, wherein the digital certificate is improper if the digital certificate fails Authenticode validation or has an invalid Authenticode.

12. The system of claim 10, further comprising:
classifying a file that includes the digital certificate as untrusted based on the determination that the digital certificate is untrusted.

* * * * *